United States Patent [19]

Sasamura et al.

[11] Patent Number: 4,789,320
[45] Date of Patent: Dec. 6, 1988

[54] STAMPER-HOLDING APPARATUS FOR USE IN INJECTION MOLD

[75] Inventors: Minoru Sasamura, Gifu; Kazutoshi Takenaka, Oogaki, both of Japan

[73] Assignee: Gifu Husky Co., Ltd., Tokyo, Japan

[21] Appl. No.: 107,489

[22] Filed: Oct. 8, 1987

[30] Foreign Application Priority Data

Oct. 15, 1986 [JP] Japan ................... 61-246179

[51] Int. Cl.⁴ ................... B29C 39/26; B29C 45/26
[52] U.S. Cl. ................... 425/190; 425/193; 425/595; 425/810; 425/192 R
[58] Field of Search ............... 264/106, 107; 425/182, 425/185, 190, 193, 451.9, 542, 595, 810

[56] References Cited

U.S. PATENT DOCUMENTS

| | | | |
|---|---|---|---|
| 1,372,992 | 3/1921 | Beadle | 425/451.9 X |
| 2,319,479 | 5/1943 | Ryder | 425/451.9 |
| 2,728,943 | 1/1956 | Hertz et al. | 425/190 |
| 3,702,749 | 11/1972 | Flusfeder et al. | 425/193 X |
| 3,792,947 | 2/1974 | Diehl | 425/193 X |
| 4,185,955 | 1/1980 | Holmes et al. | 425/542 |
| 4,260,360 | 4/1981 | Holmes et al. | 425/548 |
| 4,681,527 | 7/1987 | Amory et al. | 425/810 X |
| 4,684,101 | 8/1987 | Wagner et al. | 425/193 X |

FOREIGN PATENT DOCUMENTS 58-58214 12/1983 Japan .

*Primary Examiner*—Robert Spitzer
*Attorney, Agent, or Firm*—Flynn, Thiel, Boutell & Tanis

[57] ABSTRACT

A stamper holding apparatus comprises a holding member for holding a stamper on the mirror surface of one of stationary and movable mirror blocks, a plurality of stationary side actuation units arranged around the outer periphery of the stationary mirror block, a plurality of movable side actuation units arranged around the outer periphery of the movable mirror block, and operating rods of each stationary side actuation units and operating rods of each movable side actuation units being alternatively engageable with the holding member.

7 Claims, 3 Drawing Sheets

STAMPER-HOLDING APPARATUS FOR USE IN INJECTION MOLD

BACKGROUND OF THE INVENTION

1. Field of the Invention

This invention relates to a stamper holding apparatus for use in an injection mold, especially, of the type having a stamper disposed on the mirror surface of one of the stationary and movable mirror blocks.

2. Description of the Prior Art

Conventionally, in this type of injection mold, a stamper standing for a master of compact disk etc. is supported, at its outer circumferential edge portion, by a holding member so as to be held between the mirror surface and the holding member. More specifically, the holding member is clamped to either a stationary plate or a movable plate by means of fixing bolts and the fixing bolts are tightened to urge the holding member to hold the stamper.

In the conventional holding apparatus as above, the holding member is removed from the stationary or movable plate when exchanging the stamper, and during this procedure, the fixing bolts have to be mounted or dismounted with the mold open. Obviously, this work is time-consuming. In addition, since the mold is kept open for a long time, the amount of dust deposited on the stamper and the mirror surfaces increases. Moreover, a tool, such as a wrench, is needed for carrying out the work and the mirror surface may accidentally be damaged by the wrench.

SUMMARY OF THE INVENTION

An object of this invention is to eliminate the above drawbacks encountered in the conventional apparatus and to provide a stamper holding apparatus which permits exchange of the stamper to be done readily within a short period of time without resort to any tool.

To accomplish the above object, according to the present invention, there is provided a stamper holding apparatus wherein a plurality of stationary side actuation units are arranged around the outer periphery of a stationary mirror block, a plurality of movable side actuation units are arranged around the outer periphery of a movable mirror block, and operating rods of the stationary side actuation units and operating rods of the movable side actuation units are alternately engageable with a holding member.

When the stamper is disposed on the mirror surface of the movable mirror block, the operating rods of the movable side actuation units engage the holding member, so that the holding member is urged toward the movable mirror block to hold the stamper between the movable mirror block and holding member.

When exchanging the stamper, the operating rods of the movable side actuation units are disengaged from the holding member and at the same time the operating rods of the stationary side actuation units are brought into engagement with the holding member, so that the holding member is urged toward the stationary mirror block to release the stamper from being held.

As described above, when exchanging the stamper, only a very simple operation is required to change the engagement/disengagement relationship of the respective operating rods of the stationary side and movable side actuation units with the holding member and consequently the exchange work can be completed readily within a short period of time. Since the time required for the mold to be opened for performing the exchange can be minimized, the amount of dust deposited on the stamper and mirror surface can be decreased. Moreover, the exchange work can be carried out without using any tool and accidental damage of the mirror surfaces attributable to careless working can be prevented.

BRIEF DESCRIPTION OF THE DRAWINGS

FIGS. 1 and 2 are fragmentary longitudinal sectional views illustrating a stamper holding apparatus according to an embodiment of the invention, wherein FIG. 1 shows the relation between a movable side piston rod and a rotating ring when injection molding and FIG. 2 shows the relation between a stationary side piston rod and the rotating ring when injection molding.

DESCRIPTION OF THE PREFERRED EMBODIMENTS

Figure 1:
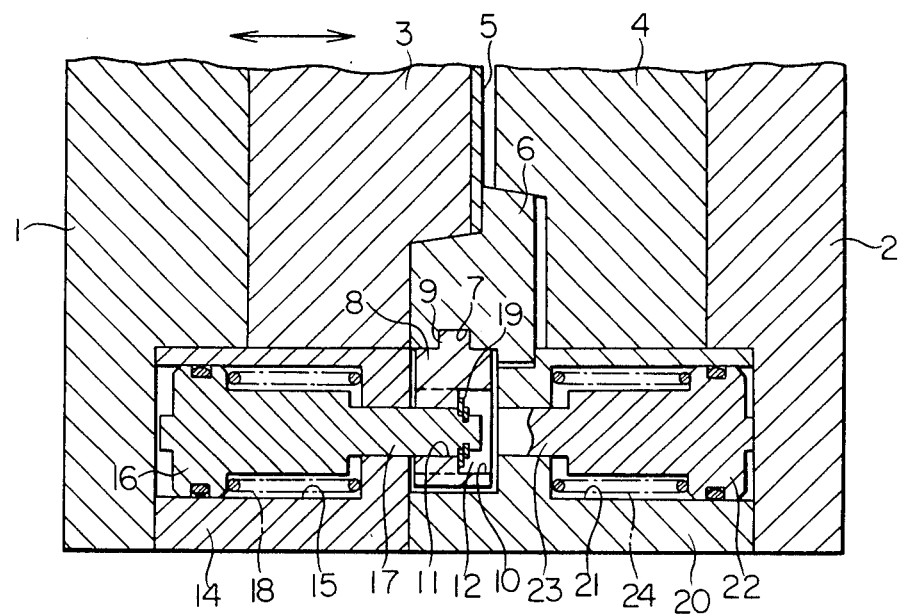
Figure 2:
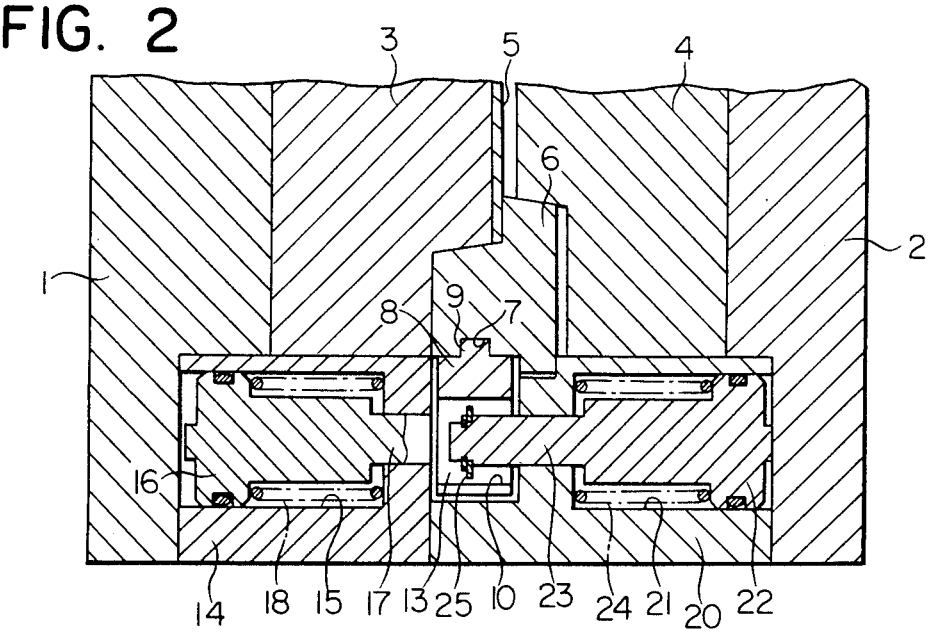
Figure 3:
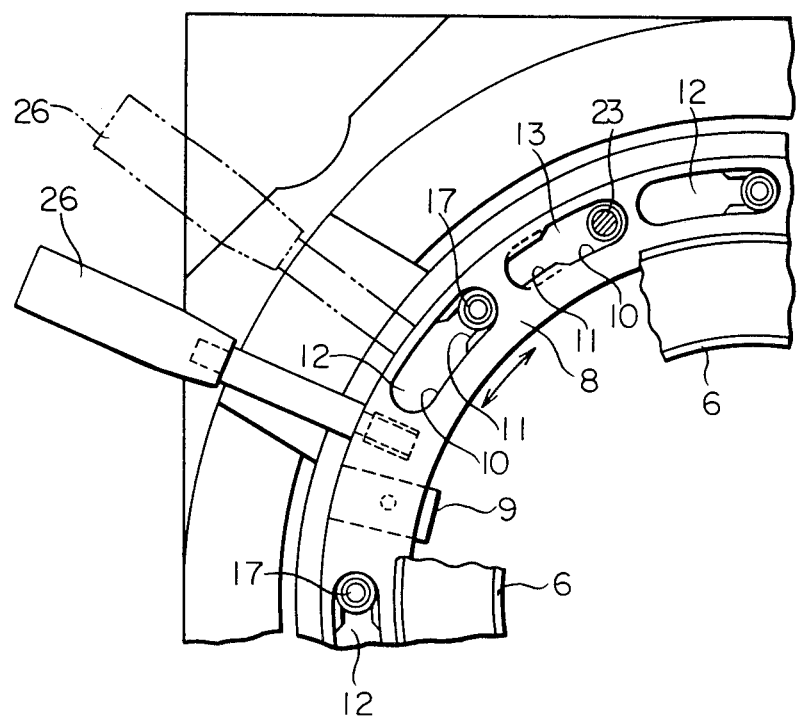
FIG. 3 is a front view, as viewed from the stationary side, illustrating a holding ring and the rotating ring.

Referring now to FIGS. 1 to 3, a movable plate 1 has a movable mirror block 3 fixed thereto and a stationry plate 2 has a stationary mirror block 4 fixed thereto. In this embodiment, an annular stamper 5 is disposed on the mirror surface of the movable mirror block 3 and an outer circumferential edge portion of the stamper 5 is supported on the mirror surface of the movable mirror block 3 by means of a holding member comprised of a holding ring 6 and a rotating ring 8. An inner circumferential edge portion of the stamper 5 is also supported on the movable mirror block 3 by means of a holding ring, not shown, which can be mounted or dismounted readily by means of a gear mechanism.

Formed in the outer peripheral surface of the holding ring 6 is an annular groove 7 with which a projection 9 of the rotating ring 8 surrounding the holding ring 6 engages. With the projection 9 being in engagement with the groove 7, the rotating ring 8 is rotatable clockwise or counterclockwise relative to the holding ring 6. The rotating ring 8 is formed with a plurality of first slots 12 and a plurality of second slots 13, the first and second slots being arranged alternately at intervals in the circumferential direction. Each of the first slots 12 has a large diameter portion 10 and a small diameter portion 11. Similarly, each slot 13 has a large diameter portion 10 and a small diameter portion 11. The large and small diameter portions 10 and 11 of the first slot 12 are positioned in opposite directional relatiohnship with those of the second slots 13 (See FIG. 3).

A retainer ring 14 is fitted on the outer periphery of the movable mirror block 3 and fixedly secured to the movable plate 1. Formed in the retainer ring 14 are a plurality of cylinder chambers 15 which are spaced apart circumferentially from each other. Slidably mounted in each cylinder chamber 15 is a piston 16 having a piston rod 17 the tip of which protrudes from the cylinder chamber 15 so as to be inserted in the small diameter portion 11 of the first slot 12 in the rotating ring 8. The piston 16 is normally biased toward the movable plate 1 by means of a coil spring 18 interposed between the piston 16 and an inner wall of the cylinder chamber 15, thereby ensuring that a washer 19 mounted at the tip of the piston rod 17 engages a circumferential edge wall of the small diameter portion 11 and as a result the holding ring 6 is urged toward the movable mirror block 3 through the medium of the rotating ring 8.

A locating ring 20 is fitted on the outer periphery of the stationary mirror block 4 and fixedly secured to the stationary plate 2. Formed in the locating ring 20 are a plurality of cylinder chambers 21 which are spaced apart circumferentially from each other. Slidably mounted in each cylinder chamber 21 is a piston 22 which is normally biased toward the stationary plate 2 by means of a coil spring 24 interposed between the piston 22 and an inner wall of the cylinder chamber 21. The tip of a piston rod 23 protrudes from the cylinder chamber 21 and is free to enter and depart from the large diameter portion 10 of the second slot 13 in the rotating ring 8. More particularly, the large diameter portion 10 exceeds the diameter of a washer 25 mounted at the tip of the piston rod 23 so that the washer 25 will not come in contact with the inner circumferential wall of the large diameter portion 10.

In the assembly described as above, closing and opening of the mold can be effected for injection molding by reciprocating the movable plate 1 together with the movable mirror block 3, holding ring 6, rotating ring 8 and retainer ring 14.

For exchange of the stamper 5, pressurized fluid is supplied to rear surfaces of the pistons 16 and 22 with the mold closed in order that their piston rods 17 and 23 are advanced in opposition to biasing force of the coil springs 18 and 24 to disengage the washer 19 of the piston rod 17 from the rotating ring 8. Under this condition, the rotating ring 8 is rotated clockwise as viewed in FIG. 3 by using a lever 26 mounted to the rotating ring 8 to align the piston rod 17 with the large diameter portion 10 of the first slot 12 and the piston rod 23 with the small diameter portion 11 of the second slot 13.

After rotation of the rotating ring 8, the supply of the pressurized fluid is stopped with the result that the piston rod 17 and 23 retreat under the influence of the biasing force of the coil springs 18 and 24. Under this condition, the washer 19 of the piston rod 17 is free to enter and depart from the large diameter portion 10 of the first slot 12 and the washer 25 of the piston rod 23 engages a circumferential edge wall of the small diameter portion 11 of the second slot 13, with the result that the holding ring 6 is urged toward the stationary mirror block 4 through the medium of the rotating ring 8.

Thereafter, the mold is opened. Since the holding ring 6 is displaced toward the stationary plate 2 through the medium of the rotation ring 8, this holding ring 6 does not follow the movement of the movable plate 1 and it is spaced apart from the movable mirror block 3, thus permitting only the stamper 5 to follow the movement of the movable mirror block 3. With the stamper moved, the not shown holding ring can be removed from the inner circumferential edge portion of the stamper 5 and this stamper can then be exchanged with another stamper.

After exchange of the stamper 5, the mold is closed and an operational procedure similar to that described previously is taken. Subsequently, the rotating ring 8 is rotated counterclockwise, whereby the piston rod 17 is brought into engagement with the rotating ring 8 and the piston rod 23 is made free to enter and depart from the slot in the rotating ring 8.

Although in the previous embodiment the holding member is comprised of two rings, i.e., the holding ring 6 and rotating ring 8, it may take the form of the unitary ring. In this case, the entirety of the holding member needs to be rotated when exchanging the stamper.

Figure 4:
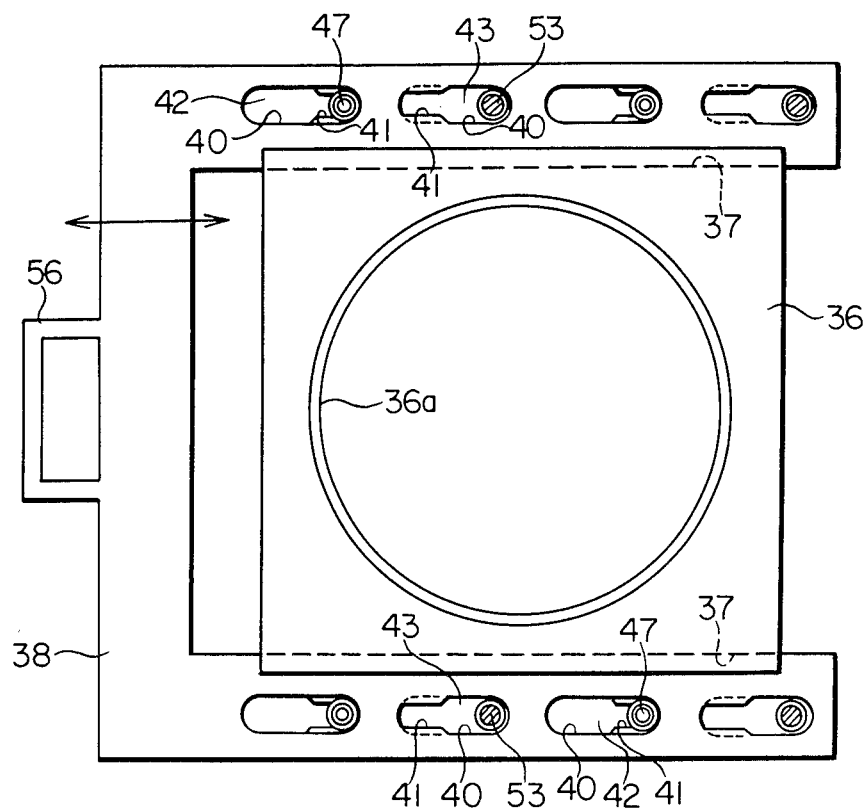
FIG. 4 is a front view, as viewed from the stationary side, illustrating a holding plate and a movable frame in accordance with another embodiment of the invention.

Referring to FIG. 4, another embodiment of the invention will be described. In this embodiment, a holding member comprises a holding plate 36 formed with a stamper holding bore 36a, and a U-shaped movable frame 38.

Two parallel opposite side surfaces of the holding plate 36 are formed with elongated grooves 37 and the movable frame 38 in engagement with the grooves 37 is straight reciprocative relative to the holding plate 36. The movable frame 38 is formed with a pluraltiy of first slots 42 and a plurality of second slots 43 as in the case of the previous embodiment, the first and second slots being arranged alternately at intervals in the direction of reciprocation.

Each first slot 42 and each second slot 43 have a large diameter portion 40 and a small diameter portion 41. The large and small diameter portions of the first slot 42 are positioned in opposite directional relationship with those of the second slot 43. As in the previous embodiment, during injection molding, a piston rod 47 for the movable side engages a circumferential edge wall of the small diameter portion 41 of the first slot 42 and a piston rod 53 for the stationary side is free to enter and depart from the large diameter portion 40 of the second slot 43. Denoted by 56 is a handle.

When exchanging the stamper, the movable frame 38 is moved to the right as viewed in FIG. 4 and the engagement/disengagement relationship of the piston rods 47 and 53 with the movable frame 38 is changed.

Figure 5:
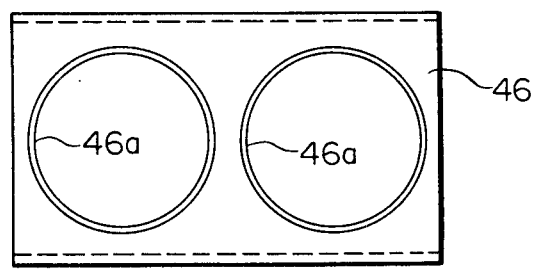
FIG. 5 is a front view illustrating another example of the holding plate.

When the mold is for simultaneous injection molding of a number of products, a holding plate 46 formed with two or more of stamper holding bores 46a as shown in FIG. 5 may be used.

While, in the foregoing embodiments, the stamper has been described as being disposed on the movable mirror block, the present invention is not limited thereto and the stamper may be disposed on the stationary mirror block.

The coil spring used as a means for biasing the piston rod may be replaced with pressurized fluid exerting bias force on the piston rod in the cylinder chamber. The piston/cylinder unit used as the actuation unit may be replaced with a solenoid unit. Thus, various modifications and alternations may be embraced by the framework of the present invention.

What is claimed is:

1. In a stamper holding apparatus for use in and injection mold comprising a stationary mirror block having a first mirror surface, a movable mirror block having a second mirror surface, said movable mirror block being reciprocable relative to said stationary mirror block, an annular stamper disposed on one of said first and second mirror surfaces, and a holding structure for supporting the outer circumferential edge portion of said stamper so as to hold said stamper between said one mirror surface and said holding structure, the improvement which comprises: a plurality of first side actuation units arranged around the outer periphery of said stationary mirror block and spaced radially outwardly from said stamper, a plurality of second side actuation units arranged around the outer periphery of said movable mirror block and spaced radially outwardly from said stamper, said first side actuation units having first operating rods and said second side actuation units having second operating rods, said first and second operating rods being operable in opposing directions relative to said stamper, said holding structure being located between said first and second actuation units and comprising a member movable back and forth in a direction transverse to the direction of movement of said operating rods between two positions, said member being alternately engageable with and disengageable from said first and second operating rods at said two positions so that when said member is in one position with said first operating rods engaging said member, said second operating rods are disengaged from said member, and when said member is at the other position with said second operating rods engaging said member, said first operating rods are disengaged from said member.

2. A stamper holding apparatus according to claim 1 wherein said holding structure comprises an annular holding ring engaging said stamper, and said member is a circumferentially shiftable ring engaged with the outer periphery of said holding ring and being shiftable between two circumferentially spaced-apart positions, said second operating rods being releasably affixed to said shiftable ring when said shiftable ring is at one circumferential position and said first operating rods being releasably affixed to said shiftable ring when said shiftable ring is at the other circumferential position.

3. A stamper holding apparatus according to claim 2 wherein said shiftable ring is formed with a plurality of first slots and a plurality of second slots, each first slot and each second slot having a large diameter portion and a small diameter portion, said large and small diameter portions of said first slots being positioned in opposite directional relationship with respect to those of said second slots, and said first and second operating rods are free to enter and depart from said large diameter portions of said first and second slots, respectively, and are engageable with circumferential edge walls of said small diameter portions of said first and second slots, respectively.

4. A stamper holding apparatus according to claim 1 wherein said member comprises a substantially rectangular holding plate formed with at least one stamper-holding bore, a movable frame movably engaged with the opposite side surfaces of said holding plate and being linearly reciprocable therealong between two positions, said second operating rods being engaged with said movable frame when said movable frame is at one position and said first operating rods being engaged with said movable frame when said movable frame is at the other position.

5. A stamper holding apparatus according to claim 4 wherein said movable frame is formed with a plurality of first slots and a plurality of second slots, each first slot and each second slot having a large diameter portion and a small diameter portion, said large and small diameter portions of said first slots being positioned in opposite directional relationship with respect to those of said second slots, said first and second operating rods being free to enter and depart from said large diameter portions of said first and second slots, respectively, and being engageable with circumferential edge walls of said small diameter portions of said first and second slots, respectively.

6. A stamper holding apparatus according to claim 1 wherein said first and second actuation units comprise piston/cylinder units.

7. A stamper holding apparatus according to claim 6 wherein the piston rods of said piston/cylinder units are said operating rods, the piston rods of said second piston/cylinder units are biased toward said movable mirror block by means of second springs and the piston rods of said first piston/cylinder units are biased toward said stationary mirror block by means of first springs.

* * * * *